(12) United States Patent
Rossi et al.

(10) Patent No.: US 10,482,375 B2
(45) Date of Patent: Nov. 19, 2019

(54) DEEP GRAPH REPRESENTATION LEARNING

(71) Applicant: Palo Alto Research Center Incorporated, Palo Alto, CA (US)

(72) Inventors: Ryan Rossi, Mountain View, CA (US); Rong Zhou, Saratoga, CA (US)

(73) Assignee: PALO ALTO RESEARCH COMPANY INCORPORATED, Palo Alto, CA (US)

( * ) Notice: Subject to any disclaimer, the term of this patent is extended or adjusted under 35 U.S.C. 154(b) by 149 days.

(21) Appl. No.: 15/802,302

(22) Filed: Nov. 2, 2017

(65) Prior Publication Data

US 2019/0130264 A1     May 2, 2019

(51) Int. Cl.

| | |
|---|---|
| *G06K 9/46* | (2006.01) |
| *G06N 3/08* | (2006.01) |
| *G06K 9/66* | (2006.01) |
| *G06K 9/62* | (2006.01) |
| *G06N 20/00* | (2019.01) |
| *G06F 16/901* | (2019.01) |
| *G06N 5/02* | (2006.01) |

(52) U.S. Cl.
CPC ........... *G06N 3/08* (2013.01); *G06F 16/9024* (2019.01); *G06K 9/469* (2013.01); *G06K 9/6232* (2013.01); *G06K 9/66* (2013.01); *G06N 5/022* (2013.01); *G06N 20/00* (2019.01)

(58) Field of Classification Search
CPC ...... G06N 3/08; G06N 20/00; G06F 16/9024; G06F 3/013; G06F 3/0304; G06K 9/469; G06K 9/6232; G06K 9/66; G06K 9/6202; G06K 9/6279; G06K 9/00785; G06K 9/00791; G06K 9/00228; G06T 7/001; G06T 2207/30261; G06T 2207/30252; G06T 2207/30236; G06T 7/73; G06T 7/50; G06T 7/55; G06T 3/0068; G06T 15/04; G01S 13/90; G01S 17/89; G01C 21/3602; B60K 31/00; B60K 37/06; A63F 13/327; A63F 13/213; A63F 13/25; A63F 13/32; A63F 13/332; A63F 13/335; A63F 13/655; A63F 13/00

See application file for complete search history.

(56) References Cited

U.S. PATENT DOCUMENTS

| | | | | |
|---|---|---|---|---|
| 9,852,231 B1 * | 12/2017 | Ravi | ...................... | G06N 20/00 |
| 2011/0282632 A1 * | 11/2011 | Rameau | .................. | G06T 17/10 |
| | | | | 703/1 |

\* cited by examiner

*Primary Examiner* — Duy M Dang
(74) *Attorney, Agent, or Firm* — Womble Bond Dickinson (US) LLP; Daniel E. Ovanezian

(57) ABSTRACT

A method of deep graph representation learning includes: calculating a plurality of base features from a graph and adding the plurality of base features to a feature matrix. The method further includes generating, by a processing device, a current feature layer from the feature matrix and a set of relational feature operators, wherein the current feature layer corresponds to a set of current features, evaluating feature pairs associated with the current feature layer, and selecting a subset of features from the set of current features based on the evaluated feature pairs. The method further includes adding the subset of features to the feature matrix to generate an updated feature matrix.

20 Claims, 6 Drawing Sheets

US 10,482,375 B2

DEEP GRAPH REPRESENTATION LEARNING

STATEMENT REGARDING FEDERALLY SPONSORED RESEARCH AND DEVELOPMENT

This invention was made with government support under Contract No. X012.2017.08 IAL-Xer-Intel Work awarded by the Defense Advanced Research Projects Agency. The Government has certain rights in this invention.

TECHNICAL FIELD

Implementations of the present disclosure relate to deep graph representation learning.

BACKGROUND

Machine learning is an application of artificial intelligence (AI) that provides systems the ability to automatically learn and improve from experience without being explicitly programmed. Machine learning focuses on the development of computer programs that can access data and use it learn for themselves. The process of learning begins with observations or data, such as examples, direct experience, or instruction, in order to look for patterns in data and make better decisions in the future based on provided examples. The primary aim is to allow the computers learn automatically without human intervention or assistance and adjust actions accordingly.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
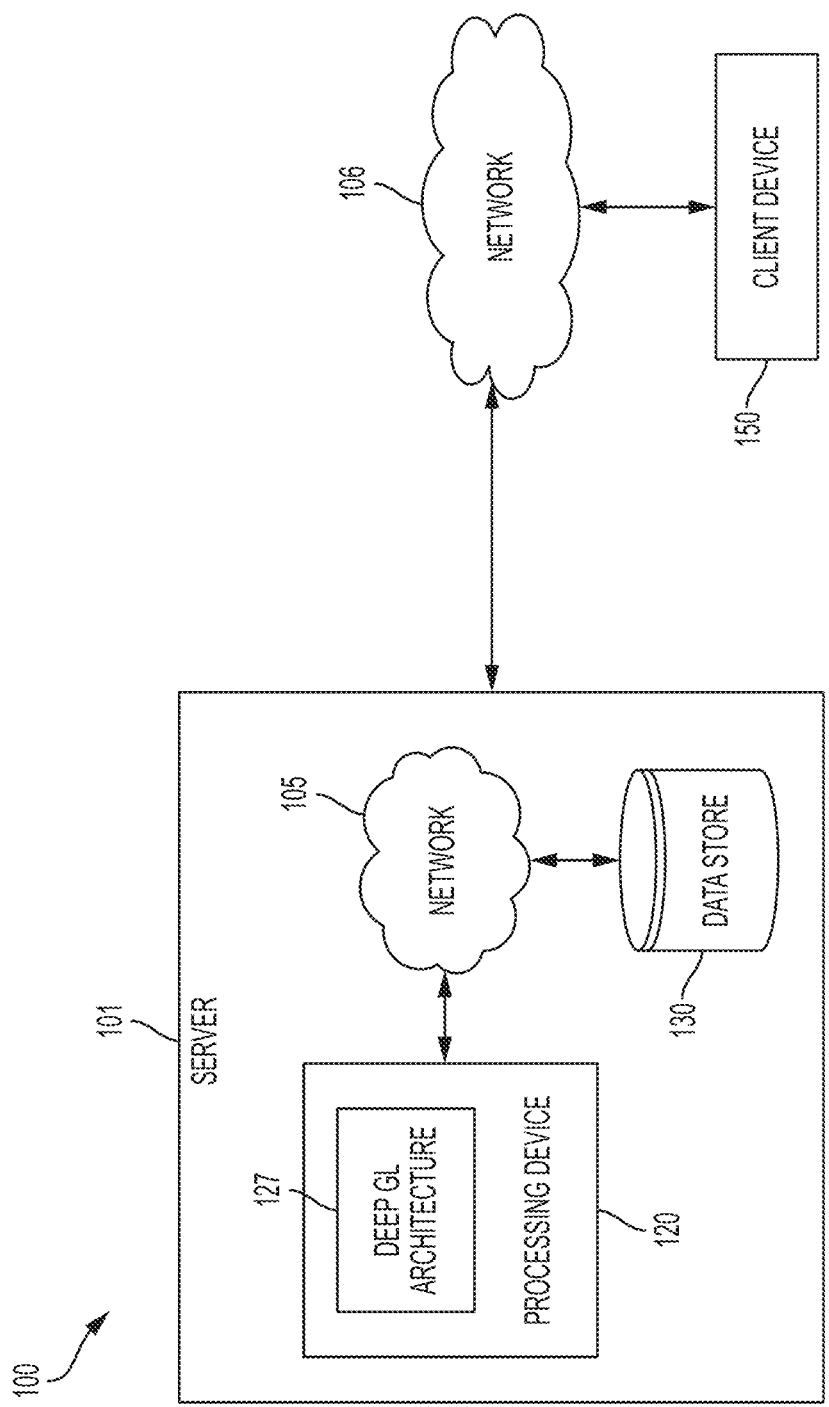
FIG. 1 is a diagram showing a deep graph representation system for use with implementations of the present disclosure.

Learning a useful graph representation aides many within-network and across-network machine learning tasks, such as node and link classification, anomaly detection, link prediction, dynamic network analysis, community detection, role discovery, visualization and sensemaking, network alignment, and many others. In some embodiments, the success of machine learning operations may depend on data representation (e.g., graph representation). Systems and operations capable of learning such representations have many advantages over feature engineering in terms of cost and effort.

Is one embodiment, a skip-gram model (for learning vector representations of words in the natural language processing (NLP) domain), for example, DeepWalk, applies the successful word embedding framework from (e.g., word2vec) to embed the nodes such that the co-occurrence frequencies of pairs in short random walks are preserved. In another embodiment, node2vec applies hyperparameters to DeepWalk that tune the depth and breadth of the random walks. These approaches may be successful and in some embodiments may outperform a number of other existing techniques on tasks such as node classification. However, they also have many limitations and restrictions that the proposed invention overcomes.

In various embodiments, node features may be used and may provide only a coarse representation of a graph. Existing techniques are also unable to leverage attributes (e.g., gender, age) and lack support for typed graphs. In addition, features from these techniques do not generalize to other networks and thus are unable to be used for across-network transfer learning tasks. Existing techniques are also not space-efficient as the node feature vectors are completely dense. For large graphs, the space required to store these dense features can easily become too large to fit in memory. The features may be difficult to interpret and explain. Furthermore, existing embedding techniques are also unable to capture higher-order subgraph structures as well as learn a hierarchical graph representation from such higher-order structures. Finally, these techniques are inefficient, with runtimes that are orders of magnitude slower than those provided by the operations and systems described herein.

To resolve the above deficiencies, the present invention presents a general graph representation learning framework (referred to herein as "DeepGL") for learning deep node and edge representations from large (attributed) graphs. In particular, embodiments of the present disclosure derive a set of base features (e.g., graphlet features) and automatically learn a multi-layered hierarchical graph representation, in which each successive layer leverages the output from the previous layer to learn features of a higher-order. Contrary to previous work, DeepGL learns relational functions (each representing a feature) that generalize across-networks and therefore may be useful for graph-based transfer learning tasks. Moreover, DeepGL naturally supports attributed graphs, learns interpretable graph representations, and is space-efficient (by learning sparse feature vectors). In one embodiment, DeepGL is expressive, flexible with many interchangeable components, efficient with a time complexity of $O(|E|)$, and scalable for large networks via an efficient parallel implementation. In one embodiment, compared to various existing methods, DeepGL may be (1) effective for across-network transfer learning tasks and attributed graph representation learning, (2) space-efficient requiring up to 6× less memory, (3) fast with up to 182× speedup in runtime performance, and (4) accurate with an average improvement of 20% or more on many learning tasks.

FIG. 1 is a diagram showing a deep graph representation (DeepGL) system 100 for use with implementations of the present disclosure. Although specific components are disclosed in DeepGL system 100, it should be appreciated that such components are examples. That is, embodiments of the present invention are well suited to having various other components or variations of the components recited in DeepGL system 100. It is appreciated that the components in DeepGL system 100 may operate with other components than those presented, and that not all of the components of DeepGL system 100 may be required to achieve the goals of DeepGL system 100.

In one embodiment, system 100 includes server 101, network 106, and client device 150. Server 100 may include various components, which may allow for deep graph representation learning operations to run on a server device or client device. Each component may perform different functions, operations, actions, processes, methods, etc., for a web application and/or may provide different services, functionalities, and/or resources for the web application. Server 100 may include DeepGL architecture 127 of processing device 120 to perform deep graph representation learning operations. In one embodiment, processing device 120 one or more graphics processing units of one or more servers (e.g., including server 101). Additional details of DeepGL architecture 127 are provided with respect to FIG. 2. Server 101 may further include network 105 and data store 130.

The processing device 120, and the data store 130 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The server 100 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the server 101 may provide deep graph representation learning functionality to a client device (e.g., client device 150). In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a wireless fidelity (WiFi) hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 100. Further implementation details of the operations performed by system 101 are described with respect to FIGS. 2-6.

Figure 2:
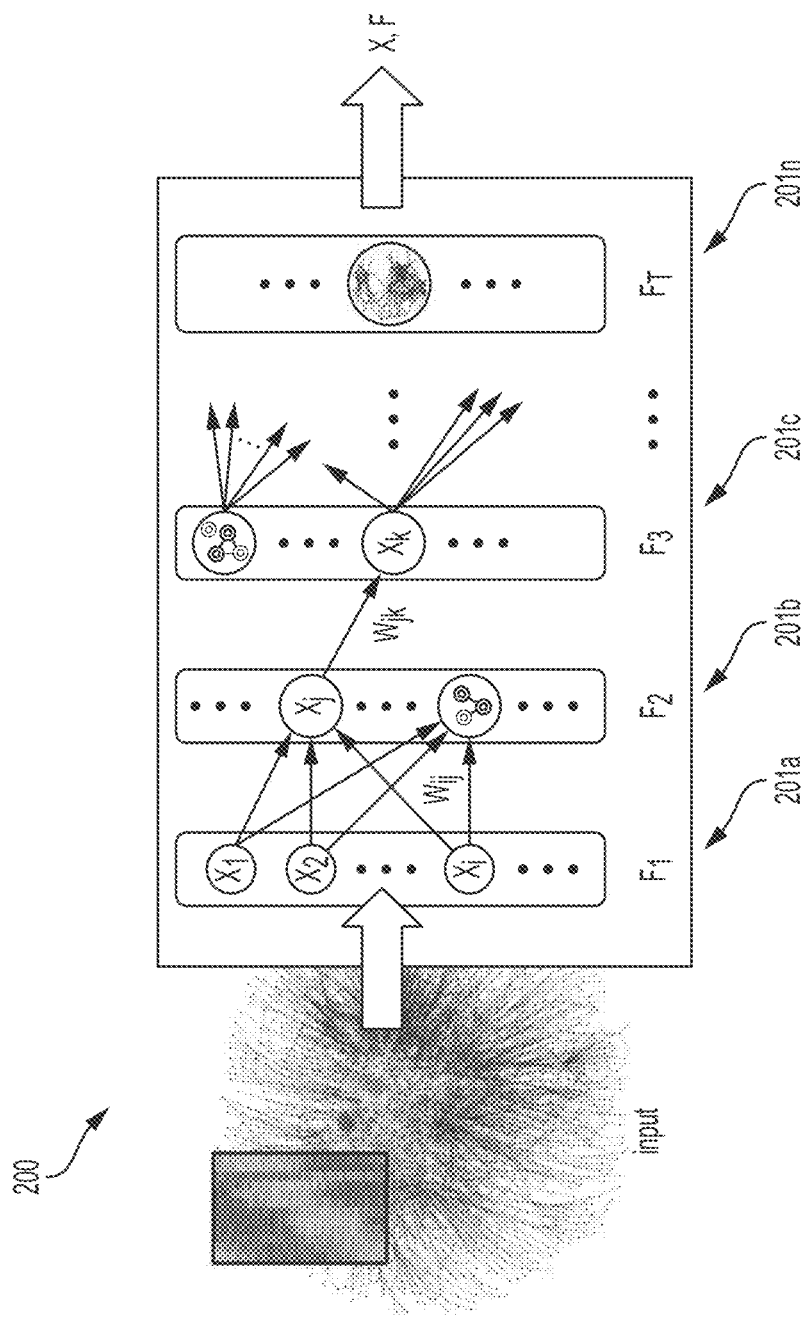
FIG. 2 is a graphical diagram showing an example DeepGL architecture, in accordance with some embodiments.

FIG. 2 is a graphical diagram 200 showing an example DeepGL architecture, in accordance with some embodiments. Worth noting is that while the architecture 200 demonstrates a directed graph and feature matrix as input, other embodiments that do not include a directed graph and feature matrix may be used. In one embodiment, $W=[W_{ij}]$ may be a matrix of feature weights where $w_{ij}$ (or $W_{ij}$) is the weight between the feature vectors $x_i$ and $x_j$. In one embodiment, W has the constraint that $i<j<k$ and $x_i$, $x_j$, and $x_k$ are increasingly deeper. $F=F_1 \cup F_2 \cup \ldots \cup F_n$, and thus, $|F|=F=|F_1|+|F_2|+\ldots+F_n|$. Moreover, the layers 201a-n are ordered where $F_1<F_2<\ldots<F_n$ such that if $i<j$ then $F_j$ is said to be a deeper layer with respect to F. Table 1 may include a summary of the notation used herein:

TABLE 1

Summary of notation

| | |
|---|---|
| G | (un)directed (attributed) graph |
| A | sparse adjacency matrix of the graph G = (V, E) |
| N, M | number of nodes and edges in the graph |
| F, L | number of learned features and layers |
| $\mathcal{G}$ | set of graph elements {g1, g2, . . .} (nodes, edges) |
| $d_v^+, d_v^-, d_v$ | outdegree, indegree, degree of vertex v |
| $\Gamma^+(g_i), \Gamma^-(g_i)$ | out/in neighbors of graph element $g_i$ |
| $\Gamma(g_i)$ | neighbors (adjacent graph elements) of $g_i$ |
| $\Gamma^\ell(g_i)$ | $\ell$-neighborhood $\Gamma(g_i) = \{g_j \in \mathcal{G} \mid dist(g_i, g_j) \le \ell\}$ |
| $dist(g_i, g_j)$ | shortest distance between $g_i$ and $g_j$ |
| S | set of graph elements related to $g_i$, e.g., $S = \Gamma(g_i)$ |
| X | a feature matrix |
| x | an N or M-dimensional feature vector |
| $X_\tau$ | (sub)matrix of features from layer $\tau$ |
| $\overline{X}$ | diffused feature vectors $\overline{X} = [\overline{x}_1 \overline{x}_2 \ldots]$ |
| $|X|$ | number of nonzeros in a matrix X |
| $\mathcal{F}$ | set of feature definitions/functions from DeepGL |
| $\mathcal{F}_k$ | k-th feature layer (where k is the depth) |
| $f_i$ | relational function (definition) of $x_i$ |
| $\Phi$ | relational operators $\Phi = \{\Phi_1, \ldots, \Phi_K\}$ |
| $\mathbb{K}(\cdot)$ | a feature evaluation criterion |
| $\lambda$ | tolerance/feature similarity threshold |
| $\alpha$ | transformation hyperparameter |
| $x' = \Phi_i<x>$ | relational operator applied to each graph element |

Figure 3:
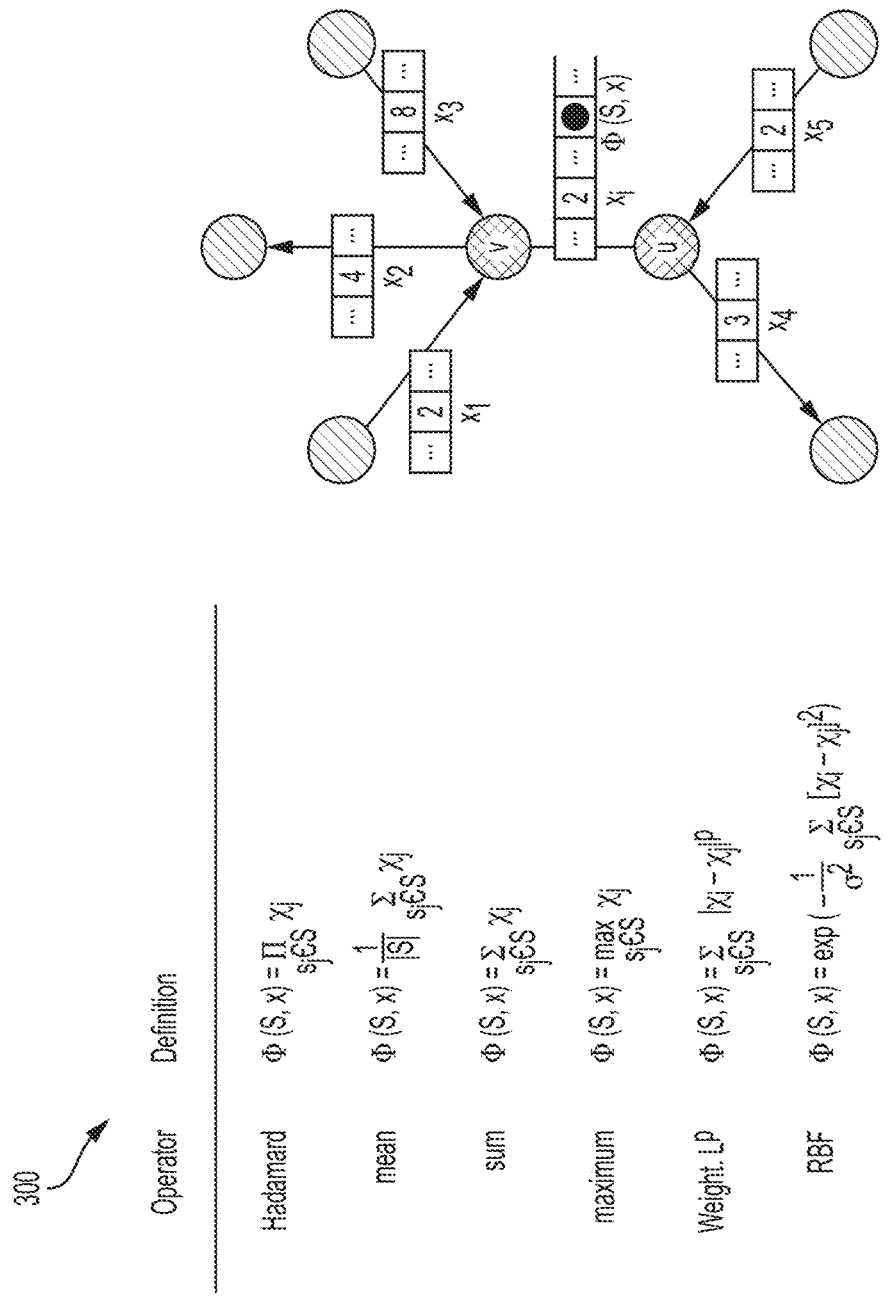
FIG. 3 is a graphical diagram showing example relational feature operators, in accordance with some embodiments.

FIG. 3 is a graphical diagram showing example relational feature operators, in accordance with some embodiments. In one embodiment, processing logic derives a set of base graph features using the graph topology and attributes (if available). In one embodiment, "graph feature" refers to an edge or node feature and includes features derived by meshing the graph structure with attributes. Worth mentioning is that DeepGL generalizes for use with an arbitrary set of base features, and it is not limited to the base features discussed below. In one embodiment, base features may be initially computed from the graph and/or set of initial attributes (if available or provided as input by the user, and can be derived from the graph structure as well. In one embodiment, base structural features may refer to counts of various graphlets, degree, egonet, etc.

Given a graph G=(V, E), processing logic may decompose G into its smaller subgraph components called graphlets (network motifs) using local graphlet decomposition operations and append these features to X. Processing logic may derive such features by counting all node or edge orbits with up to 4 and/or 5-vertex graphlets. Orbits (graphlet automorphisms) are counted for each node or edge in the graph based on whether a node or edge representation is warranted (as the operations described herein naturally generalize to both). In one embodiment, there are 15 node and 12 edge orbits with 2-4 nodes and 73 node and 68 edge orbits with 2-5 nodes.

In one embodiment, processing logic may utilize exact and estimation methods to derive such base features efficiently. DeepGL generalizes for a variety of graphlet features, including directed graphlets, typed/heterogeneous graphlets, temporal graphlet features, among other graphlet variations (that move beyond the original definition of graphlets as small undirected untyped and static subgraphs).

Processing logic may derive simple base features, such as in/out/total/weighted degree and k-core numbers, for each graph element (node, edge) in G. For edge feature learning processing logic may derive edge degree features for each edge $(v, u) \in E$ and each $o \in \{+, x\}$ as follows: $[d^+_v \circ d^+_u, d^-_v \circ d^-_u, d^-_v \circ d^+_u, d^+_v \circ d^-_u, d_v \circ d_u]$, where $d^+_v \circ d^-_u$, wherein $d^+_v$, $d^-_v$, and $d_v$ denote the out-/in/total degree of v. In addition, egonet features may be used. The external and within-egonet features for nodes may be used as base features in DeepGL-node. Processing logic may extend these egonet features to edges for learning edge representations. For the above base features, processing logic may derive variations based on direction (in/out/both) and weights (weighted/unweighted). In one embodiment, DeepGL naturally supports many other graph properties including efficient/linear-time properties such as PageRank. Moreover, fast approximation methods with provable bounds can also be used to derive features such as the local coloring number and largest clique centered at the neighborhood of each graph element (node, edge) in G.

One advantage of DeepGL lies in its ability to naturally handle attributed graphs. Four general cases are discussed below that include learning a node or edge feature-based representation given an initial set of node or edge attributes. For learning a node representation (via DeepGL-node) given G and an initial set of edge attributes, processing logic derives node features by applying the set of relational feature operators to each edge attribute. Conversely, learning an edge representation (DeepGL-edge) given G and an initial set of base node features (and optionally an initial set of attributes), processing logic may derive edge features by applying each relational operator $\Phi_k \in \Phi$ to the nodes at either end of the edge. In another embodiment, each relational operator $\Phi_k \in \Phi$ can be applied to the various combinations of in/out/total neighbors of each pair of nodes i and j that form an edge. When the input attributes match the type of graph element (node, edge) for which a feature representation is learned, then the attributes are simply appended to the feature matrix X.

In one embodiment, processing logic calculates the space of relational functions that can be expressed and searched over by DeepGL. In one embodiment, unlike recent node embedding methods other techniques, the DeepGL learns graph functions that are transferable across-networks for a variety of important graph-based transfer learning tasks such as across-network prediction, anomaly detection, graph similarity, matching, among others.

In one example, f may denote a relational function (e.g., feature in DeepGL) as a composition of relational feature operators. Further, $F=\{F_1, F_2, \ldots\}$ as a set of feature layers where each $F_h \in F$ represents a set of relational functions (definitions) $F_h=\{\ldots f_{k-1}, f_k, f_{k+1} \ldots\}$ of depth h. $f \in F_h$ denotes a relational function of depth h defined as a composition of h relational feature operators. Thus, processing logic can decompose f into at least h simpler functions, such as $\Phi_h \circ \ldots \circ \Phi_2 \circ \Phi_1$. Besides the actual composition of functions that define f, processing logic may store the base feature x (e.g., triangles, 5-star centers) that is used with the relational function to derive the novel (learned) feature vector $x'=f(x)=(\Phi_h \circ \ldots \circ \Phi_2 \circ \Phi_1)(x)$. Note that $f_i$ refers to the relational function (definition) of the i-th feature vector $x_1$. Worth nothing is that F may refer to a set of relational functions itself, even though it is an ordered set of feature layers, each of which is a set of relational functions.

The space of relational functions searched via DeepGL may defined compositionally in terms of a set of relational feature operators $\Phi=\{\Phi_1, \ldots, \Phi_K\}$. A few example relational feature operators are provided in FIGS. 4A and 4B for a wide variety of other useful relational feature operators. The expressivity of DeepGL (i.e., space of relational functions expressed by DeepGL) depends on a few flexible and interchangeable components, including: (i) the initial base features (derived using the graph structure, initial attributes given as input, or both), (ii) a set of relational feature operators $\Phi=\{\Phi_1, \ldots, \Phi_K\}$, (iii) the sets of "related graph elements" $S \in S$ (e.g., the in/out/all neighbors within L hops of a given node/edge) that are used with each relational feature operator $\Phi_p \in \Phi$, and (iv) the number of times each relational function is composed with another (i.e., the depth). In one embodiment, initial attributes may be attributes given as input by the user, which can be self or intrinsic attributes such as gender, age, income, structural features, or even deep features learned from another method, etc.

Worth noting is that under this formulation each feature vector x' from X (that is not a base feature) can be written as a composition of relational feature operators applied over a base feature. For instance, given an initial base feature x, let $x'=\Phi_k(\Phi_j(\Phi_i<x_i>))=(\Phi_k \circ \Phi_j \circ \Phi_i)(x)$ be a feature vector given as output by applying the relational function constructed by composing the relational feature operators $\Phi_k \circ \Phi_j \circ \Phi_i$. In one embodiment, more complex relational functions are easily expressed such as those involving compositions of different relational feature operators (and possibly different sets of related graph elements). Furthermore, as illustrated herein DeepGL is able to learn relational functions that often correspond to increasingly higher-order subgraph features based on a set of initial lower-order (base) subgraph features (e.g., all 3, 4, and/or 5 vertex subgraphs). Intuitively, just as filters are used in Convolutional Neural Networks (CNNs), one can think of DeepGL in a similar way, but instead of simple filters, DeepGL includes features derived from lower-order subgraphs being combined in various ways to capture higher-order subgraph patterns of increasingly complexity at each successive layer.

In one embodiment, processing logic may derive a wide variety of functions compositionally by adding and multiplying relational functions (e.g., $\Phi_i+\Phi_j$, and $\Phi_i \times \Phi_j$). A sum of relational functions is similar to an OR operation in that two instances are "close" if either has a large value, and similarly, a product of relational functions is analogous an AND operation as two instances are close if both relational functions have large values.

Referring to FIG. 3, table 300 includes a summary of a few relational feature operators. Note that DeepGL is flexible and generalizes to any arbitrary set of relational operators. The set of relational feature operators can be learned via a validation set. Block 301 includes an example for an edge e=(v; u) and a relational operator $\Phi_k \in \Phi$.

Figure 4A:
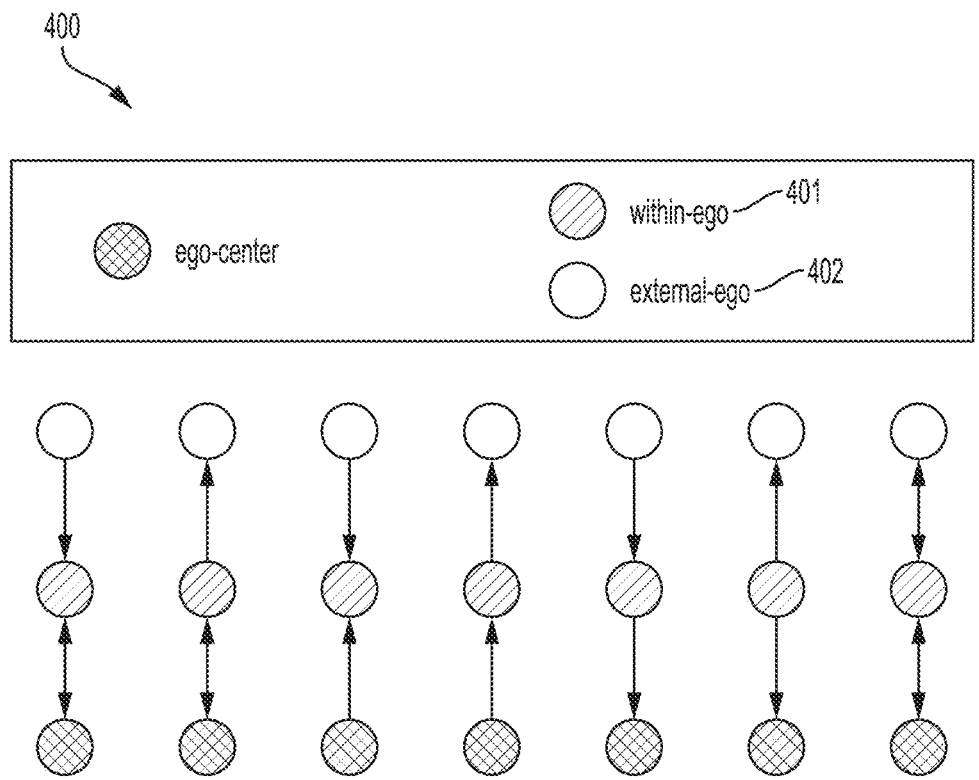
FIG. 4A is a graphical diagram showing example external egonet features, in accordance with some embodiments.
Figure 4B:
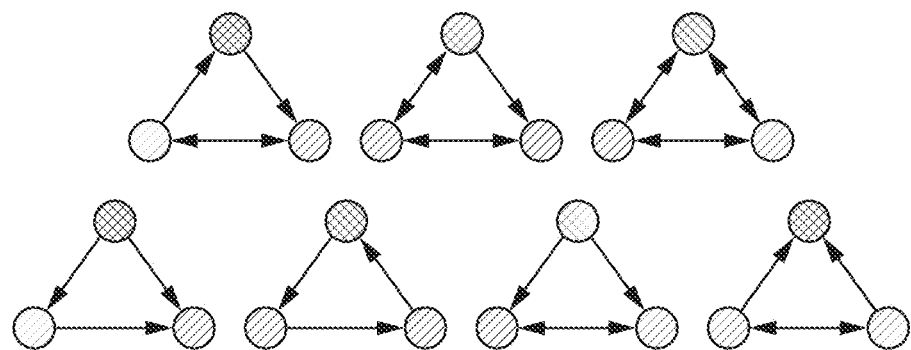
FIG. 4B is a graphical diagram showing example within-egonet features, in accordance with some embodiments.

FIGS. 4A and 4B are a graphical diagram 400 showing example external egonet features 402 and within-egonet features 401, in accordance with some embodiments. Worth noting is that the base features demonstrated in FIGS. 4A and 4B are non-limiting examples of potential base features, though the embodiments described herein work with any approach that can compute base features, etc.

Figure 5:
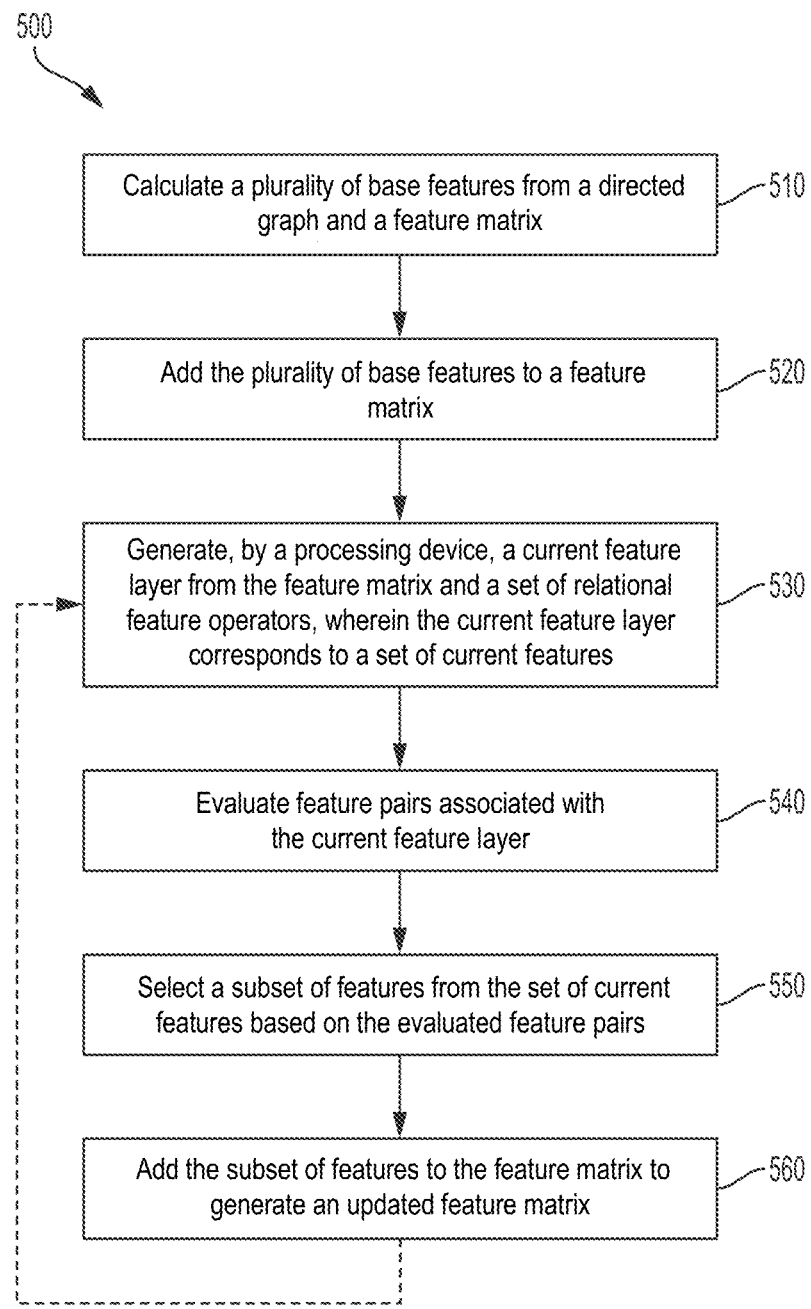
FIG. 5 is a graphical flow diagram showing a method of deep graph representation learning, in accordance with some embodiments.

FIG. 5 is a graphical flow diagram 500 showing a method of deep graph representation learning, in accordance with some embodiments. For example, the processes described with reference to FIG. 5 may be performed by processing logic of DeepGL architecture 127 as described with reference to FIG. 1 (and 200 of FIG. 2).

In one embodiment, processing logic may execute the following pseudocode of algorithm 1:

Processing logic may receive a set of base features and uses these as a basis for learning deeper and more discriminative features of increasing complexity. Optionally, processing logic may transform the base feature vectors. Various transformation schemes and other techniques may be used for transforming the feature vectors appropriately. At block 520, processing logic adds the plurality of base features to a feature matrix.

At block 530, processing logic generates, by a processing device, a current feature layer from the feature matrix and a set of relational feature operators, wherein the current feature layer corresponds to a set of current features. In one embodiment, the current features (and all features described herein) may be transfer learned features (e.g., inductive learned features, across-network features, etc.) Processing logic learns a hierarchical graph representation, where each successive layer represents increasingly deeper higher-order (edge/node) graph functions (due to composition): $F_1 < F_2 < \ldots < F_\tau$ s.t. if i<j then $F_j$ is said to be deeper than Fi. In particular, the feature layers $F_2, F_3, \ldots, F_\tau$ may be learned as follows: Processing logic may derive the feature layer F,

---

Algorithm 1 The DeepGL framework for learning deep graph representations (node/edge features) from (attributed) graphs where the features are expressed as relational functions that naturally transfer across-networks.

---

Require:
    a directed and possibly weighted/labeled/attributed graph G = (V, E)
    a set of relational feature operators $\Phi = \{\Phi_1, \ldots, \Phi_K\}$ (Fig. 2)
    a feature evaluation criterion $\mathcal{K}\langle ., . \rangle$
    an upper bound on the number of feature layers to learn T 1:   Given G and X, construct base features (see text for further details) and add the feature vectors to X and definitions to $\mathcal{F}_1$; and set $\mathcal{F} \leftarrow \mathcal{F}_1$.
2:   Transform base feature vectors (if warranted); Set $\tau \leftarrow 2$
3:   repeat   ▷ feature layers $\mathcal{F}_\tau$ for $\tau = 2, \ldots, T$
4:     Search the space of features defined by applying relational feature operators $\Phi = \{\Phi_1, \ldots, \Phi_K\}$ to features $[\ldots x_i \, x_{i+1} \ldots]$ given as output in the previous layer $\mathcal{F}_{\tau-1}$ (via Alg. 2). Add feature vectors to X and functions/def. to $\mathcal{F}_\tau$.
5:     Transform feature vectors of layer $\mathcal{F}_\tau$ (if warranted)
6:     Evaluate the features (functions) in layer $\mathcal{F}_\tau$ using the criterion $\mathcal{K}$ to score feature pairs along with a feature selection method to select a subset (e.g., see Alg. 3).
7:     Discard features from X that were pruned (not in $\mathcal{F}_\tau$) and set $\mathcal{F} \leftarrow \mathcal{F} \cup \mathcal{F}_\tau$
8:     Set $\tau \leftarrow \tau + 1$ and initialize $\mathcal{F}_\tau$ to Ø for next feature layer
9:   until no new features emerge or the max number of layers (depth) is reached
10:   return X and the set of relational functions (definitions) $\mathcal{F}$

---

At block 510, processing logic calculates a plurality of base features from a graph. In one embodiment, the graph may be a directed graph, an undirected graph, a bipartite graph, or a weighted graph. In one embodiment, the base features may be calculated based on an initial feature matrix.

by searching over the space of graph functions that arise from applying the relational feature operators $\Phi$ to each of the novel features $f_i \in F\tau-1$ learned in the previous layer. Additional description is provided in the following pseudocode of algorithm 2:

---

Algorithm 2 Derive a feature layer using the features from the previous layer and the set of relational feature operators $\Phi = \{\Phi_1, \ldots, \Phi_K\}$.

---

1   procedure FEATURELAYER(G, X, $\Phi, \mathcal{F}, \mathcal{F}_{\tau-1}$)
2     parallel for each graph element $g_i \in \mathcal{G}$ do
3       Reset t to f for the new graph element $g_i$ (edge, node)
4       for each feature $x_k$ s.t. $f_k \in \mathcal{F}_{\tau-1}$ in order do
5         for each $S \in \{\Gamma_\ell^+(g_i), \Gamma_\ell(g_i), \Gamma_\ell(g_i)\}$ do
6           for each relational operator $\Phi \in \Phi$ do   ▷ See Fig. 2
7             $X_{it} = \Phi \langle S, x_k \rangle$ and $t \leftarrow t + 1$
8     Add feature definitions to $\mathcal{F}_\tau$
9     return feature matrix X and $\mathcal{F}_\tau$ Optionally, processing logic may transform the feature vectors from layer $F_\tau$ as discussed previously.

At block 540, processing logic evaluates feature pairs associated with the current feature layer and selects a subset of features from the set of current features based on the evaluated feature pairs (block 550). Processing logic evaluates resulting features in layer $F_\tau$. The feature evaluation routine chooses the important features (relational functions) at each layer r from the space of novel relational functions (at depth r) constructed by applying the relational feature operators to each feature (relational function) learned (and given as output) in the previous layer r-1. Notice that DeepGL is extremely flexible as the feature evaluation routine is completely interchangeable and can be fine-tuned for specific applications and/or data. One example of a feature evaluation is provided in the following pseudocode of algorithm 3:

---

Algorithm 3 Score and prune the feature layer

---

1  procedure EVALUATEFEATURELAYER(G, X, $\mathcal{F}$, $\mathcal{F}_\tau$)
2      Let $\mathcal{G}_F = (V_F, E_F, W)$ be the initial feature graph for feature
       layer $\mathcal{F}_\tau$ where $V_F$ is the set of features from $\mathcal{F} \cup \mathcal{F}_\tau$ and
       $E_F = \emptyset$
3      parallel for each feature $f_i \in \mathcal{F}_\tau$ do
4          for each feature $f_j \in (\mathcal{F}_{\tau-1} \cup \ldots \cup \mathcal{F}_1)$ do
5              if $\mathbb{K}(x_i, x_j) > \lambda$ then
6                  Add edge (i, j) to $E_F$ with weight $W_{ij} = \mathbb{K}(x_i, x_j)$
7      Partition $\mathcal{G}_F$ using connected components $\mathcal{C} = \{\mathcal{C}_1, \mathcal{C}_2, \ldots\}$
8      parallel for each $\mathcal{C}_k \in \mathcal{C}$ do    ▷ Remove features
9          Find the earliest feature $f_i$ s.t. $\forall f_j \in \mathcal{C}_k : i < j$.
10         Remove $\mathcal{C}_k$ from $\mathcal{F}_\tau$ and set $\mathcal{F}_\tau \leftarrow \mathcal{F}_\tau \cup \{f_i\}$

---

This approach derives a score between pairs of features. Pairs of features $x_i$ and $x_j$ that are strongly dependent as determined by the hyperparameter A and evaluation criterion K are assigned $W_{ij}$=K(xi, xj) and Wij=0 otherwise More formally, $E_F$ may denote the set of edges representing dependencies between features:

$$E_F = \{(i,j) | \forall (i,j) \in \mathcal{F}_{|x|} \mathcal{F}_{|x|} \text{ s.t. } \mathbb{K}(x_i, x_j) > \lambda\} \quad (1)$$

The result may be a weighted feature dependence graph $G_F$. $G_F$ may be used select a subset of important features from layer $\tau$. Features may be selected as follows: Processing logic may partition the feature graph $G_F$ into groups of features $\{C_1, C_2, \ldots\}$, where each set $C_k \in C$ represents features that are dependent (though not necessarily pairwise dependent). To partition the feature graph $G_F$, processing logic of Algorithm 3 uses connected components, though other methods are also possible, e.g., a clustering or community detection method. Next, one or more representative features are selected from each group (cluster) of dependent features. Alternatively, it is also possible to derive a new feature from the group of dependent features, e.g., finding a low-dimensional embedding of these features or taking the principal eigenvector. In the example given in Algorithm 3: the earliest feature in each connected component $C_k = \{\ldots, f_i, \ldots, f_j, \ldots\} \in C$ is selected and all others are removed. After pruning the feature layer $F_\tau$, the discarded features are removed from X and DeepGL updates the set of features learned thus far by setting $F \leftarrow F \cup F_1$. Processing logic at block 560 adds the subset of features to the feature matrix to generate an updated feature matrix.

Next, processing logic increments $\tau$ and sets $F_\tau$ to zero. In one embodiment, processing logic may check for convergence, and if the stopping criterion is not satisfied, DeepGL tries to learn an additional feature layer. In contrast to node embedding methods that output only a node feature matrix X, DeepGL outputs the (hierarchical) relational functions (definitions) F corresponding to the learned features.

In one embodiment, additional considerations and properties of DeepGL are discussed below. In one embodiment, processing logic may add and remove constraints in DeepGL. For instance, instead of ensuring that features from previous layers are always retained, processing logic may allow such features from previous layers to be pruned. Many other relaxations and extensions are also possible. Worth noting again, is that algorithms 2 and 3 are non-limiting example routines, and DeepGL naturally generalizes for use with others. While algorithm 1 leverages hyperparameters such as $\lambda$, and $\alpha$, both of these can be automatically learned using a validation set. Further, even the appropriate transformation scheme and/or set of relational feature operators can be learned in a similar fashion. Also noteworthy is that $\lambda$ (and possibly other hyperparameters) can be set initially, and then automatically adapted at various granularities, e.g., one can introduce a $\lambda$ for each layer $\tau$, or a $\lambda$ for each feature or each pair of features (which can be computed based on statistics derived from the feature-values). One can also introduce other hyperparameters into DeepGL to control for various factors such as: hyperparameters of any relational feature kernel (RBF, Polynomial, Sigmoid, and others), the graphlet (orbit, or network motif/subgraph) estimation quality, a hyperparameter governing the diffusion process (e.g., $\theta$ in the Laplacian feature diffusion process), max number of relational feature operators to search, or even a hyperparameter that decays the weight of a relational feature operator with respect to the distance l such that $\theta^l$ where $0 < \theta < 1$, among many other possibilities.

Notice that the evaluation criterion $K(x_i, x_j)$ discussed above can be viewed as a "similarity function" (since it is usually assumed that the output of $K(x_i, x_j)$ is between 0 and 1 where xi and xj are considered more dependent (similar/correlated/etc) as $K(x_i, x_j)$ approaches 1). In other embodiments processing logic may leverage a distance (or disagreement measure, etc.) as well (where xi and vxj are considered more dependent as $K(x_i, x_j)$ approaches 0, etc.), e.g., one could simply replace Line 5 in Algorithm 3 with $K(x_i, x_j) < \lambda$ so that two features $x_i$ and $x_j$ are dependent (similar) if the fraction of which they disagree is less than some threshold $\lambda$.

Notice that Algorithm 2 is generalized further by replacing $\{\Gamma_l^+(g_i), \Gamma_l^-(g_i), \Gamma_l(g_i)\}$ in Line 5 by a set S. In one embodiment, Algorithm 1 naturally generalizes for (within-network and across-network) supervised learning tasks as well. One can also introduce additional weights (or use the previous feature weights directly) and use back propagation for training in conjunction with an optimization scheme such as stochastic gradient descent to minimize a loss function over them. In one embodiment, DeepGL learns a set of relational functions (definitions) which require at most 1 MB to store, and usually much less. Hence, DeepGL can be thought of as learning a compressed representation of the graph, as one may simply transfer these relational functions (definitions) and then use DeepGL on the other end to recompute the actual feature vectors for the nodes and edges. Thus, unlike existing methods, DeepGL essentially is a graph compression method as well, which can be leveraged in a variety of applications. Finally, one can also derive fast sub-linear time learning methods for DeepGL that learns the relational functions using a small fraction of the data. Once the relational functions (definitions) are learned, they can be extracted directly (no learning) to obtain the feature vectors for the graph elements (e.g., nodes/edges). In one embodiment, the above sub-linear time approach can exploit any (state-of-the-art) subsampling technique.

In one embodiment, the systems and operations described herein provide for feature diffusion, where the feature matrix at each layer can be smoothed using any arbitrary feature diffusion process. As an example, suppose X is the resulting feature matrix from layer τ, then we can set $^-X(0) \leftarrow X$ and solve $^-X(t)=D^{-1}A\ ^-X^{(t-1)}$ where D is the diagonal degree matrix and A is the adjacency matrix of G. The diffusion process above is repeated for a fixed number of iterations t=1, 2, . . . , T or until convergence; and $^-X(t)=D^{-1}A\ ^-X^{(t-1)}$ corresponds to a simple feature propagation.

More complex feature diffusion processes can also be used in DeepGL such as the normalized Laplacian feature diffusion defined as:

$$\overline{X}^{(t)} = (1-\theta)L\overline{X}^{(t-1)} + \theta X, \text{ for } t=1,2,\ldots \qquad (2)$$

where L is the normalized Laplacian:

$$L = I - D^{1/2}AD^{1/2} \qquad (3)$$

The resulting diffused feature vectors $\_X=[\_x1\ \_x2 \ldots]$ are effectively smoothed by the features of related graph elements (nodes/edges) governed by the particular diffusion process. Notice that feature vectors given as output at each layer can be diffused (e.g., after Line 4 or 8 of Algorithm 1). The resulting features X can be leveraged in a variety of ways. For instance, processing logic may set $\_X \leftarrow X$ and thereby replace the existing features with the diffused versions. In another embodiment, processing logic may append the diffused features by setting $X \leftarrow [X\_X]$. Further, the diffusion process can be learned via cross-validation.

In one embodiment, the DeepGL framework naturally generalizes for supervised representation learning by replacing the feature evaluation routine (called in Algorithm 1 Line 7) with an appropriate objective function, e.g., one that seeks to find a set of features that (i) maximize relevancy (predictive quality) with respect to y (i.e., observed class labels) while (ii) minimizing redundancy between each feature in that set. The objective function capturing both (i) and (ii) can be formulated by replacing K with a measure such as mutual information (and variants):

$$x = \arg\max_{x_i \in \mathcal{X}} \left\{ \mathbb{K}(y, x_i) - \beta \sum_{x_j \in X} \mathbb{K}(x_i, x_j) \right\} \qquad (4)$$

where X is the current set of selected features; and β is a hyperparameter that determines the balance between maximizing relevance and minimizing redundancy. The first term in Eq. (3) seeks to find x that maximizes the relevancy of x to y whereas the second term attempts to minimize the redundancy between x and each $x_j \in X$ of the already selected features. Initially, processing logic may set $X \leftarrow \{x^0\}$ where $x^0 = \arg\max_{x_i} K(y, x_i)$ and repeatedly solve equation (3)) to find $x_i$ (such that $x_i \notin X$) which is then added to X (and removed from the set of remaining features). This is repeated until the stopping criterion is reached (e.g., until the desired |X|). Notably, DeepGL naturally supports many other objective functions and optimization schemes.

In one embodiment, M is the number of edges, N is the number of nodes, and F is the number of features. The total computational complexity of the edge representation learning from the DeepGL framework is O(F(M+NF)). Similarly, the DeepGL framework takes O(F(M+NF)) for learning node representations. Thus, in both cases, the runtime of DeepGL is linear in the number of edges. As an aside, the initial graphlet features are computed using fast and accurate estimation methods.

In one embodiment, given a set of feature functions (definitions) F learned by applying DeepGL to G, feature extraction is defined as the process of extracting (computing directly without learning) the set of features on another graph G°. This is possible since the features learned from DeepGL generalize since they represent a composition of relational feature operators applied to a base graph feature, which are computable on any arbitrary graph. This is in contrast to recent node embedding methods where the features are unable to transfer (and are meaningless across networks).

As described herein, the features learned by DeepGL naturally generalize across-networks. For convenience, let $x_j = p(x_i)$ where $x_i$ is a feature given as output in the £−1 feature layer and $\Phi_{kp}(.)$ is an arbitrary relational feature operator such as relational mean, max, product, etc. Thus, $x_j$ is the resulting feature vector in layer £ after applying $\Phi_p$ to $x_i$ over all graph elements (nodes, edges, etc.), and thus i<j where $X=[x_1 \ldots x_i \ldots x_j \ldots]$. Nevertheless, consider a feature definition learned via our approach: $\Phi_2(\Phi_1(x_i))$ where $\Phi_1(.)$ and $\Phi_2(.)$ are defined as the relational mean and product kernel, respectively. Furthermore, suppose xi is a simple initial feature such as the number of 4-cliques. Thus, the feature definition $\Phi_2(\Phi_1(x_i))$ can be easily unrolled as $x_j = \Phi_1(x_i)$ and then $x_k = \Phi_2(x_j)$. The above feature is derived in the third feature layer, assuming xi is from the first layer. Now, it should be clear that the feature definitions learned by DeepGL generalize for across-network transfer learning tasks as they are extracted on any arbitrary network. For instance, given G', processing logic may derive the number of 4-cliques denoted by xi, and then derive $x_j = \Phi_1(x_i)$ and finally $x_k = \Phi_2(x_j)$. Such feature definitions represent general graph functions that may be extracted on any arbitrary graph. As an aside, the features learned by DeepGL are also more interpretable and explainable than recent node embedding techniques.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 6:
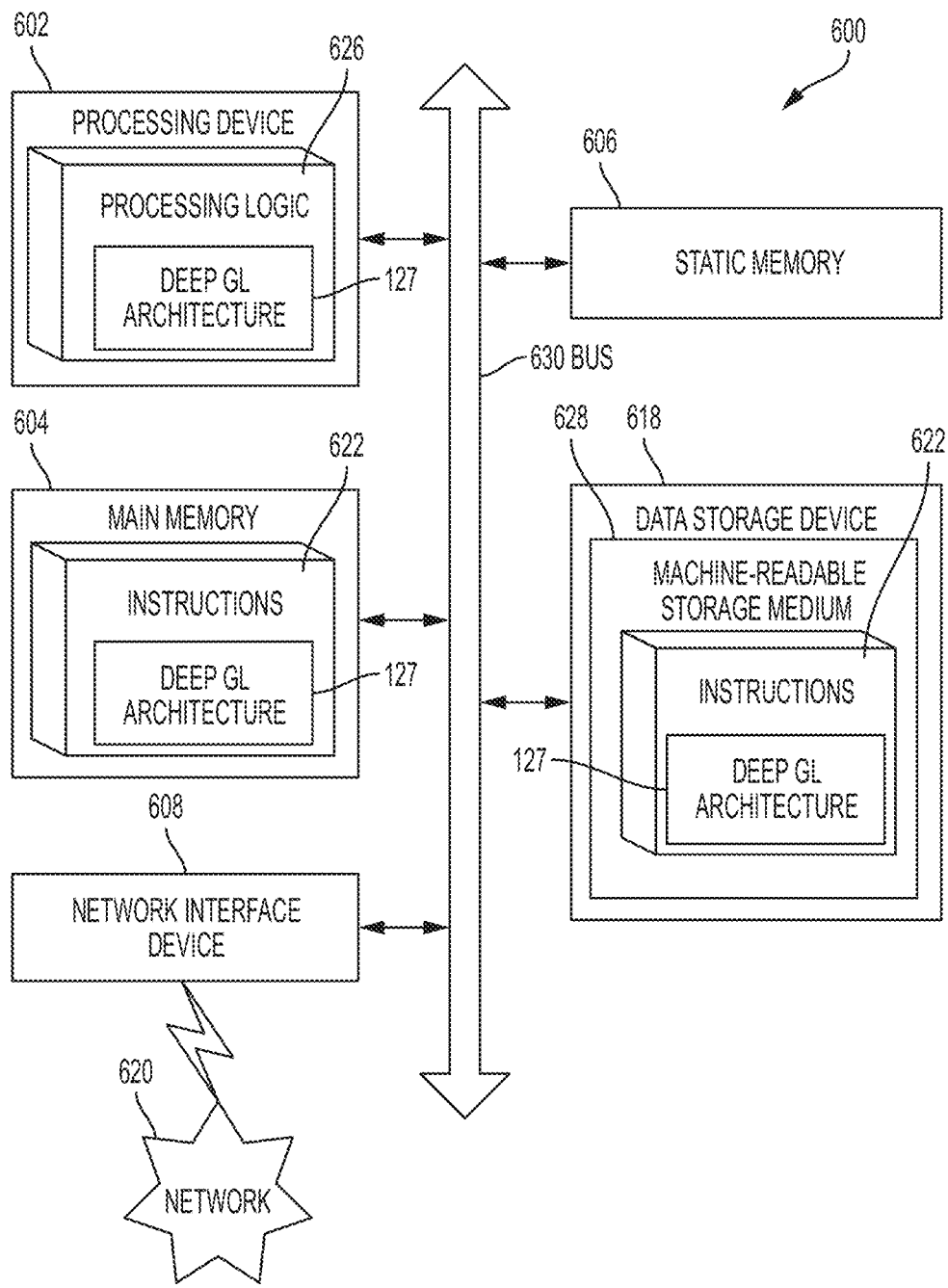
FIG. 6 is an illustration showing an example computing device which may implement the embodiments described herein.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server computer system, such as system 100.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 100 shown in FIG. 1, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute system 100. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform the methods and operations described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of deep graph representation learning, the method comprising:
    calculating a plurality of base features from a graph;
    adding the plurality of base features to a feature matrix;
    (i) generating, by a processing device, a current feature layer from the feature matrix and a set of relational feature operators, wherein the current feature layer corresponds to a set of current features;
    (ii) evaluating feature pairs associated with the current feature layer;
    (iii) selecting a subset of features from the set of current features based on the evaluated feature pain; and
    (iv) adding the subset of features to the feature matrix to generate an updated feature matrix.

2. The method of claim 1, further comprising:
    incrementing the current feature layer to generate a new current feature layer; and
    repeating steps (i) through (iv) for the new current feature layer until no new features emerge or a max number of layers is reached.

3. The method of claim 1, further comprising:
    transforming the plurality of base features after generating a current feature layer; and
    adding the plurality of transformed base features to the updated feature matrix to generate a new updated feature matrix.

4. The method of claim 1, further comprising: transforming the set of current features after generating a current feature layer.

5. The method of claim 1, wherein a plurality of features in the feature matrix are transfer learning features.

6. The method of claim 1, wherein the graph is one of a directed graph, an undirected graph, a bipartite graph, or a weighted graph.

7. The method of claim 6, wherein selecting the subset of features further comprises: applying a set of relational feature operators to each feature of a previous feature layer.

8. A system comprising:
    a memory; and
    a processing device, operatively coupled to the memory, to:
        calculate a plurality of base features from a graph;
        add the plurality of base features to a feature matrix;
    (i) generate a current feature layer from the feature matrix and a set of relational feature operators, wherein the current feature layer corresponds to a set of current features;
    (ii) evaluate feature pairs associated with the current feature layer;
    (iii) select a subset of features from the set of current features based on the evaluated feature pairs; and
    (iv) add the subset of features to the feature matrix to generate an updated feature matrix.

9. The system of claim 8, wherein the processing device is further to:
    increment the current feature layer to generate a new current feature layer, and
    repeat steps (i) through (iv) for the new current feature layer until no new features emerge or a max number of layers is reached.

10. The system of claim 8, wherein the processing device is further to:
    transform the plurality of base features after generating a current feature layer; and
    add the plurality of transformed base features to the updated feature matrix to generate a new updated feature matrix.

11. The system of claim 8, wherein the processing device is further to: transform the set of current features after generating a current feature layer.

12. The system of claim 8, wherein the processing device is one or more graphics processing units of one or more servers.

13. The system of claim 8, wherein the graph is one of a directed graph, an undirected graph, a bipartite graph, or a weighted graph.

14. The system of claim 13, wherein to select the subset of features the processing device is to: apply a set of relational feature operators to each feature of a previous feature layer.

15. A non-transitory computer-readable storage medium having instructions stored thereon that, when executed by a processing device, cause the processing device to:
    calculate a plurality of base features from a graph;
    add the plurality of base features to a feature matrix;
    (i) generate, by the processing device, a current feature layer from the feature matrix and a set of relational feature operators, wherein the current feature layer corresponds to a set of current features;
    (ii) evaluate feature pairs associated with the current feature layer;
    (iii) select a subset of features from the set of current features based on the evaluated feature pairs; and
    (iv) add the subset of features to the feature matrix to generate an updated feature matrix.

16. The non-transitory computer-readable storage medium of claim 15, wherein the processing device is further to:
    increment the current feature layer to generate a new current feature layer; and
    repeat steps (i) through (iv) for the new current feature layer until no new features emerge or a max number of layers is reached.

17. The non-transitory computer-readable storage medium of claim 15, wherein the processing device is further to:
    transform the plurality of base features after generating a current feature layer; and
    add the plurality of transformed base features to the updated feature matrix to generate a new updated feature matrix.

18. The non-transitory computer-readable storage medium of claim 15, wherein the processing device is further to: transform the set of current features after generating a current feature layer.

19. The non-transitory computer-readable storage medium of claim 15, wherein a plurality of features in the feature matrix are transfer learning features.

20. The non-transitory computer-readable storage medium of claim 15, wherein the graph is one of a directed graph, an undirected graph, a bipartite graph, or a weighted graph.

* * * * *